United States Patent [19]

Erickson et al.

[11] Patent Number: 5,797,007
[45] Date of Patent: Aug. 18, 1998

[54] PERSISTENT OBJECT STORAGE SYSTEM WITH DEFAULT OBJECT ENCODER/DECODER

[75] Inventors: Charles Robert Erickson, Cedar Park; Roger Hereward Sessions, Austin, both of Tex.

[73] Assignee: International Business Machines Corporation, Armonk, N.Y.

[21] Appl. No.: 77,348

[22] Filed: Jun. 14, 1993

[51] Int. Cl.$^6$ .................................................. G06F 7/00
[52] U.S. Cl. .................................................. 395/683
[58] Field of Search .................................. 395/500, 600

[56] References Cited

U.S. PATENT DOCUMENTS

| | | | |
|---|---|---|---|
| 5,161,225 | 11/1992 | Abraham et al. | 395/600 |
| 5,291,593 | 3/1994 | Abraham et al. | 395/600 |
| 5,295,256 | 3/1994 | Bapat | 395/200 |
| 5,317,730 | 5/1994 | Moore et al. | 395/600 |
| 5,341,478 | 8/1994 | Travis, Jr. et al. | 395/200 |
| 5,347,632 | 9/1994 | Filepp et al. | 395/200 |

OTHER PUBLICATIONS

*OOPSLA '91*, 1991, "An Extensible Kernel Object Management System", R. Yaseen et al. pp. 247-263.

*OOPSLA '86 Proceedings*, Sep. 1986, "Experience with Flamingo: A Distributed, Object-Oriented User Interface System", D. B. Anderson, pp. 177-185.

*ACM Sigplan Workshop on Object-Based Concurrent Programming*, San Diego CA, Sep. 1988, "Transactions for Concurrent Object-Oriented Programming Systems", G. E. Kaiser, pp. 136-138.

*IEEE Software*, "A Dynamic C-Based Object-Oriented System for UNIX", S. Engelstad et al. pp. 73-85.

*1989 ACM 0-89791-306-X/89/0006/0101*, "Experience with CST: Programming and Implementation", W. Horwat et al. pp. 101-109.

*1991 ACM 0-89791-425-2/91/0005/0288*, "Incomplete Objects—A Data Model for Design and Planning Applications", T. Imielinski et al. pp. 288-297.

*Primary Examiner*—Kevin J. Teska
*Assistant Examiner*—Ayni Mohamed
*Attorney, Agent, or Firm*—David A. Mims, Jr.; Mark S. Walker

[57] ABSTRACT

A system and method for storing object information on a persistent medium. A DefaultEncoderDecoder is supplied that encodes object persistent attribute data into a string of attribute names, types and data values. The encoding and decoding is managed by one or more get and one or more set methods. The get methods control storing of the data while set methods control restoring of persistent data. Encoded strings of attribute data are upwardly compatible through replacement or overriding of the set methods.

8 Claims, 4 Drawing Sheets

PERSISTENT OBJECT STORAGE SYSTEM WITH DEFAULT OBJECT ENCODER/DECODER

This invention is related to commonly assigned patent applications Ser. No. 08/018,608, now abandoned, and Ser. No. 08/018,893 filed Feb. 17, 1993, respectively.

BACKGROUND OF THE INVENTION

1. Field of the Invention

The present invention relates to data processing systems and more particularly to systems for creating application programs or operating system programs. Still more particularly, the present invention relates to object oriented systems having persistent object storage functions operable to store and restore persistent objects without operator modification.

2. Background and Related Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization. Each object has certain data attributes and processes or methods that operate on that data. Data is said to be "encapsulated" by an object and can only be modified by the object methods. Methods are invoked by sending a message to an object identifying the method and supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class. I.e. a new subclass needs to specify only the functions and data that distinguish that class from the existing more general class.

The ability to override an existing method description enables polymorphism, the ability to have a single message to an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

Objects created by a data processing system are typically maintained in the volatile memory of those systems. This allows faster processing, but does not provide a means to store data. Object oriented systems solve this problem by implementing "persistent objects." "Persistence" means that an object's state can be preserved beyond the termination of the process that created that object. The persistent framework include methods that allow persistent objects to be stored in and retrieved from a non-volatile medium such as a hard disk drive or writable optical disk. Objects can be stored individually or grouped with other objects.

The use of Persistent Streams to capture and retain database queries and results is discussed in U.S. Pat. No. 5,161,225 to Abraham et al., commonly assigned.

Existing persistent object systems are limited by their fixed implementation of object storage. A particular object oriented product typically provides one mechanism for storing persistent objects. This mechanism includes a definition of the non-volatile medium used, the structure of object groups stored on the medium and the structure of each particular object stored on the medium.

Fixed implementations of persistent objects limit the developer flexibility to change persistent object storage to meet particular system requirements. A fixed storage scheme requires that the method for restoring data remains constant thereby constraining the developers from improving or enhancing the application. A change to the number or types of parameters to which an object responds would prevent restoration of previously stored objects in a fixed storage system.

Fixed implementations have the advantage, however, of requiring no coding effort by the developer before being able to store persistent objects. The developer frequently does not have the time or training to be able to develop a customized persistent storage framework. These developers need an ability to store persistent data in a flexible framework without the concerns of later system incompatibility and without the need to devise their own storage mechanism.

The existing technical problem addressed by the present invention is to provide a persistent object framework that provides flexible and upwardly compatible persistent object storage without requiring developer coding of the storage methods.

SUMMARY OF THE INVENTION

It is therefore an object of the present invention to provide a persistent object system that enables persistent storage and retrieval of objects without requiring programming by the operator.

It is yet another object of the invention to provide an object framework that allows restoration of persistent objects without storing persistent object format information with the object.

It is still another object of the invention to provide persistent data storage that is upwardly compatible using object oriented techniques.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The preferred embodiment will be described with reference to the above figures.

Figure 1:
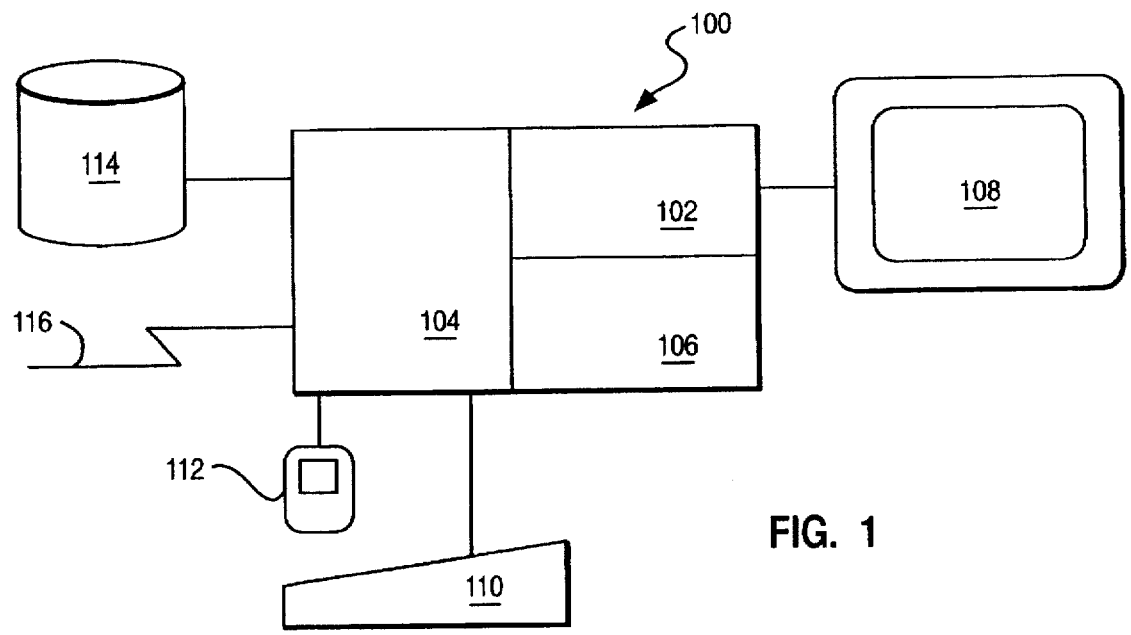
FIG. 1 is a block diagram of system on which the present invention operates.

An object oriented programming system operates on a computer system such as that shown in FIG. 1. The computer system can be a "Personal Computer", workstation, minicomputer or mainframe type of computer. FIG. 1 illustrates a personal computer such as the IBM PS/2 Model 95 computer (IBM and PS/2 are trademarks of the IBM Corporation.) The computer typically includes a system unit 100 which contains a processor or CPU 102 and memory 104. An object oriented program 106 operates on the processor and is resident in memory 104. The system will typically have a display device 108 such as a color or monochrome CRT, a keyboard 110, a pointing device 112 such as a mouse or trackball, a fixed disk drive 114, and optionally, a network connection 116 to a LAN or other network.

Figure 2:
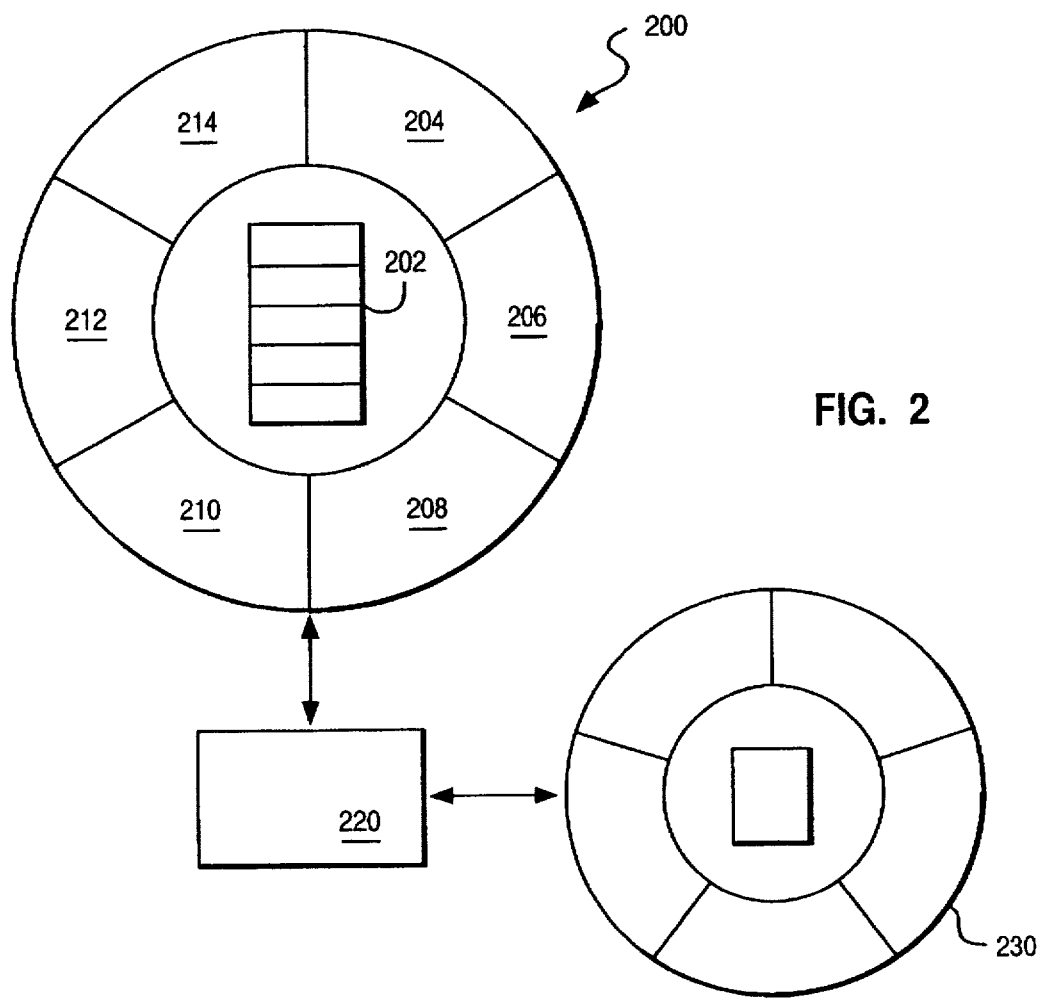
FIG. 2 is an illustration of an object according to the present invention.

An object encapsulates data and the methods needed to operate on that data. Objects can be represented by a "doughnut diagram" such as shown in FIG. 2. Object data is shown in the center 202 surrounded by the applicable methods 204 to 214. Data 202 may be modified only by the methods of that object. Methods 204–214 are invoked by receiving messages from other objects. A typical object oriented system will have a message router 220 that routes messages between objects. Thus, object 230 causes Method C 208 to be invoked by sending a message 232 to the message router that in turn sends it 222 to Method C 208 of object 200.

Object frameworks are constructed to provide a set of objects for application and system developers to use to construct a delivered system. The IBM System Object Model (SOM) framework, for example, provides a language independent set of objects for use in systems development. The IBM OS/2 Version 2.0 Workplace Shell is an example of an application developed using such an environment.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

Figure 3:
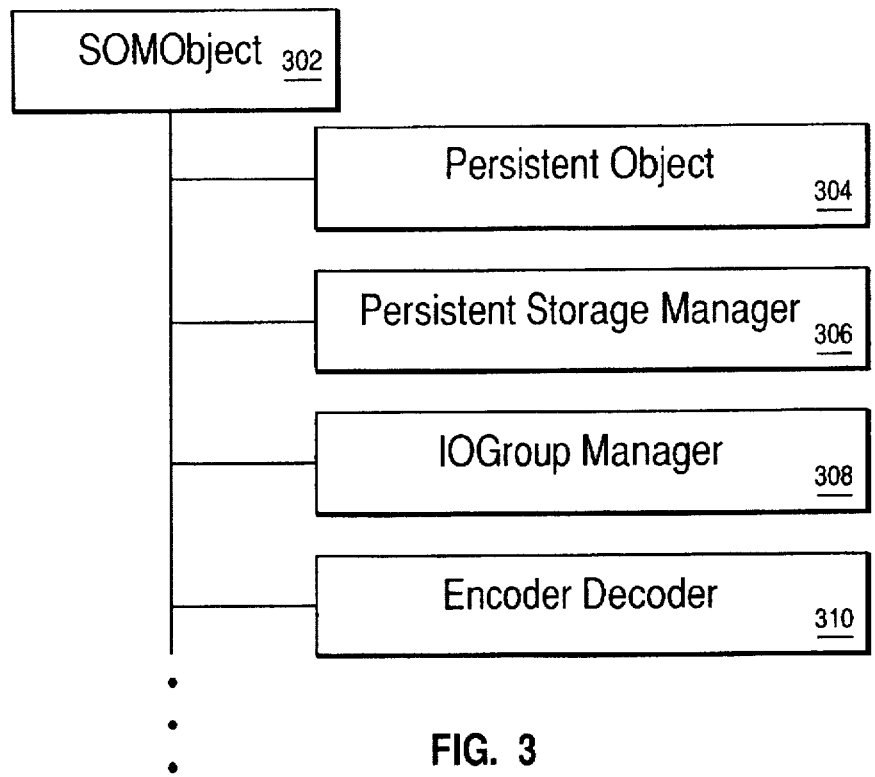
FIG. 3 is a hierarchical representation of classes in the preferred embodiment.

Classes in an object oriented system are often derived from some single base class. This base class is named "SOMObject" in the IBM System Object Model. FIG. 3 illustrates the preferred embodiment of the present invention by showing the class hierarchy for Persistent Objects using the System Object Model.

The class "PersistentObject" 304 is a subclass of SOMObject 302 and contains the methods and variables necessary to create persistent objects. Because it is a subclass of SOMObject it inherits all methods and variables known to SOMObject. Also derived from SOMObject 302 are PersistentStorageManager 306, IOGroupManager 308, and EncoderDecoder 310. These subclasses are abstract classes for implementing overall management of persistent objects (PersistentStorageManager), for controlling the structure and grouping of persistent objects on the persistent object storage medium (IOGroupManager), and for writing object information to the storage medium (EncoderDecoder.)

Figure 4A:
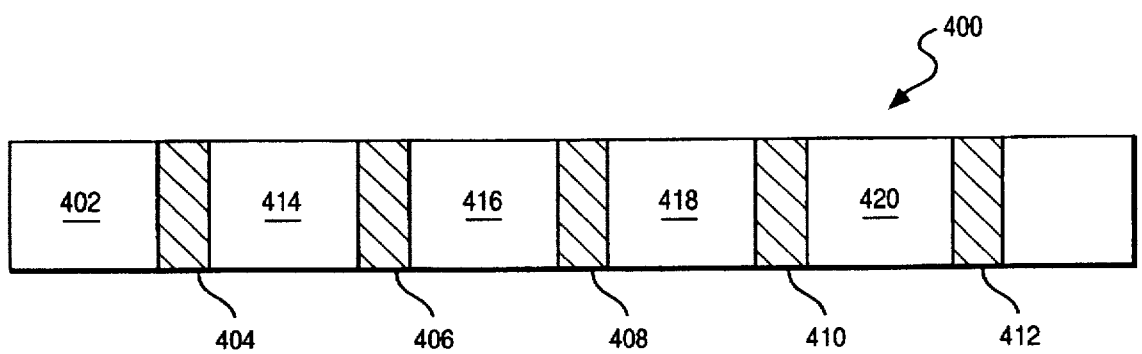
FIG. 4a and 4b are representations of a persistent data storage group skeletal framework.
Figure 4B:
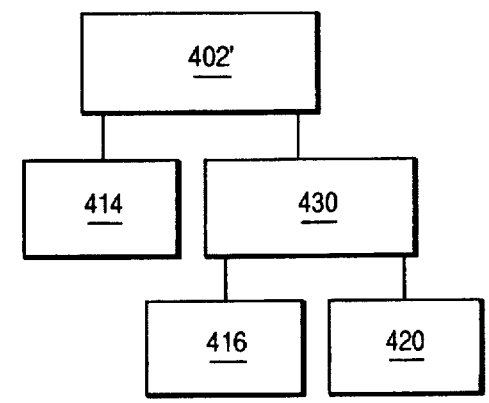

The IOGroupManager abstract class 308 controls the grouping and organization of groups of objects on the persistent storage medium. Persistent objects are stored in related groups of objects. The structure of object group storage is called the Group Skeletal Format and defines a skeleton within which the objects are stored. The most straightforward structure is storing the object description in plain ASCII text with objects stored sequentially within a group. FIG. 4 illustrates the group skeletal format for this object structure.

The group skeletal format 400 contains a Object Group Header 402 that contains group data, a number of object separators 404 406 . . . 412 and object storage blocks 414 416 . . . 420. Storage of objects within a storage block 414 is controlled by the EncoderDecoder class.

EncoderDecoder 310 functions to reformat object instance data from the internal object storage format to a format that can be written to a persistent storage medium (e.g. a disk.) The persistent format must contain sufficient information to restore the object to internal storage in the same state as when it was written.

An EncoderDecoderAbstract class is implemented in the preferred embodiment to define the interfaces to concrete EncoderDecoder subclasses derived by the application developer or developer. The EncoderDecoderAbstract class defines the interface to the following methods. EncoderDecoderWrite formats and writes the instance data of a particular object using a selected media interface. EncoderDecoderRead reads from the selected media interface and restores the object from the persistent format to internal object format.

The EncoderDecoder of the present invention sends messages to the selected IOGroupManger for all media specific functions, including preparing the device, opening and closing the device, and physically writing and reading the data from the device.

The preferred embodiment of the present invention provides a DefaultEncoderDecoder to implement flexible, generalized storage of object information. The DefaultEncoderDecoder relies on a repository of information about the class of an object including the data types of attributes of the class. It further relies on a means to identify attributes of a class as persistent attributes. The repository used to contain the above information about an object is known as an Interface Repository. Finally, the DefaultEncoderDecoder relies on a "set" and a "get" method for each persistent attribute, a consistent mapping of persistent attribute name to the name of the method used to get/set the attribute and a consistent get/set method signature for each supported data type. The "get" method or methods control storage of the persistent object, while the "set" method or methods control restoration of the object.

The preferred embodiment implements attributes as specified by the standards of the Object Management Group. Attributes are the public data associated with objects. Each attribute is required by the standards to have a get and set method. Persistent attributes are indicated by the keyword "persistent" next to the attribute names in the Interface Definition Language (IDL) entries for the object.

The DefaultEncoderDecoder is activated when storage of an object is required. The DefaultEncoderDecoder consults the Interface Repository to determine if the object has any data attributes and if so whether any of the data attributes have been identified as persistent. For each of the persistent object data attributes, the DefaultEncoderDecoder consults the Interface Repository to determine the data type of the attribute. Given the name of the persistent attribute and its data type, the DefaultEncoderDecoder constructs a "get" method request. The attribute "get" method is then invoked to retrieve the data to be stored. The DefaultEncoderDecoder generates a stream of data for each persistent data attribute. The stream of data includes the data type of the persistent attribute, the attribute name and the data returned from the attribute "get" method. All basic attribute data types are supported including integers, floating point numbers, character strings, arrays and sequences of these types and structures of any of these types. The resulting stream is concatenated with all streams generated from that object and written to persistent storage.

The persistent stream, according to the present invention, is written as an ASCII stream of attribute names and parameters. Although the preferred embodiment writes and ASCII stream, any other format could be used, including EBCDIC or binary. The stream is in a readily parsed format to allow reconstruction of the object.

The structure of the object can be understood by reference to the following example:

```
interface Person : SOMPPersistentObject
{
    attribute string name;
    attribute short deptNum;
    // Attribute get/set methods:
    void _set_name(string name);
    string _get_name();
    void _set_deptNum(short num);
    short _get_deptNum();
    implementation
    {
        // Attribute modifiers identify which
        // attributes are persistent
        name: persistent;
        deptNum: persistent;
    };
};
```

The DefaultEncoderDecoder stores the essential object information as an ASCII string having the following preferred format;

1. For each persistent attribute in the object:
   a. number of characters in the persistent attribute name;
   b. name of attribute;
   c. data type of the attribute;
   d. data returned by the attribute "get" method.
2. An "End of Attributes" marker to signal the end of the data stream upon restore of the object.

The stream of data stored for an instance of the above example object would result in a string such as:

```
(4)name(19)David(7)deptNum(20)(987)EOA
 |  |  |  |  |  |  |  |  |
 |  |  |  |  |  |  |  |  End of attrib marker
 |  |  |  |  |  |  |  data for attrib "deptNum"
 |  |  |  |  |  |  data type for attrib "deptNum"
 |  |  |  |  |  name of attribute
 |  |  |  |  length of next name of attribute
 |  |  |  data for attribute "name"
 |  |  data type for attribute "name"
 |  name of attribute
 length of next name of attribute
```

Figure 5:
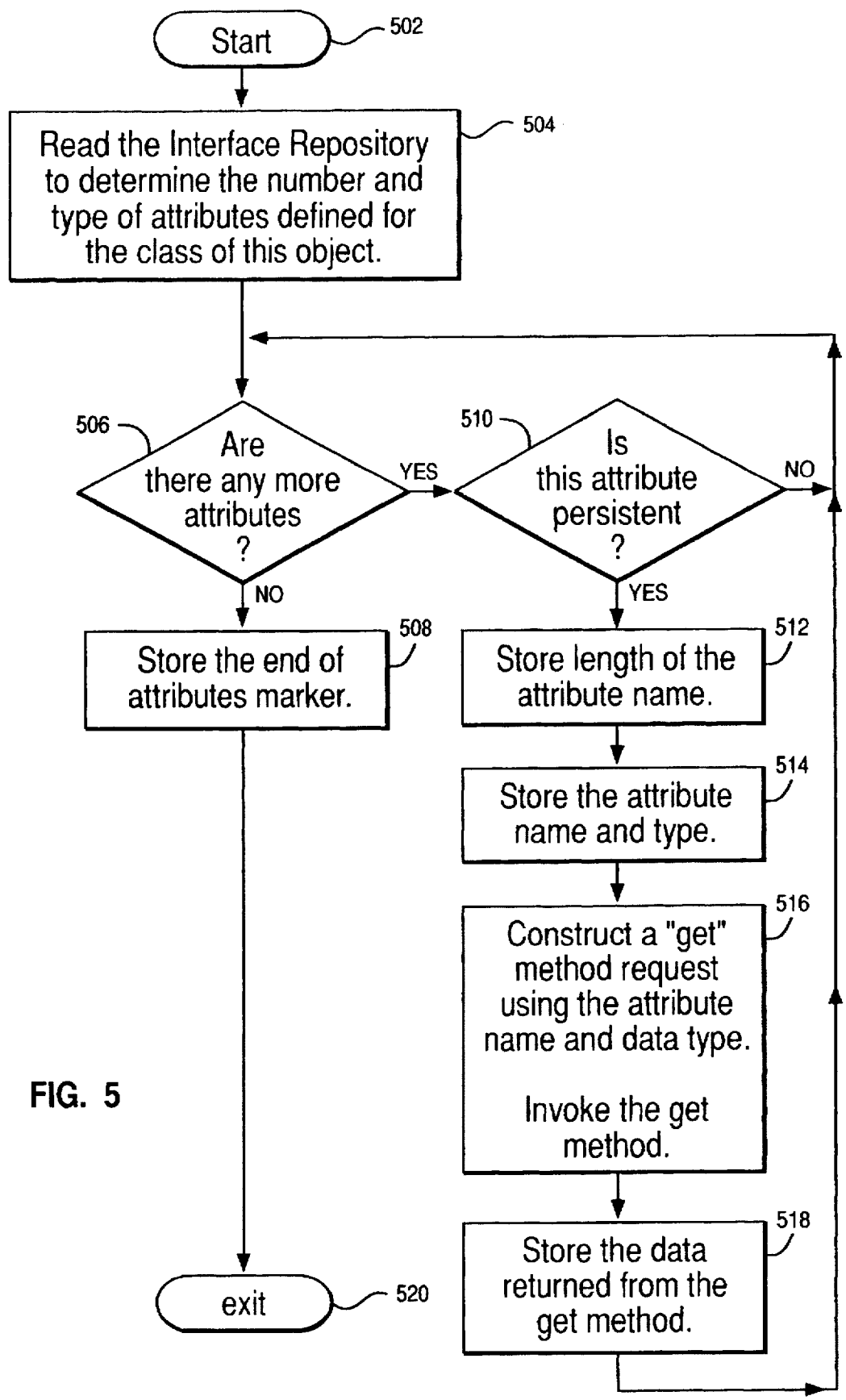
FIG. 5 is a flowchart depicting the DefaultEncoder process according to the present invention.

The process of the preferred embodiment for encoding object data for persistent storage will be described with reference to FIG. 5. The Persistent Object Manager 306 is instructed by the program to store an object. The PersistentStorageManager in turn instructs an IOGroupManger 308 to instantiate an EncoderDecoder, the DafaultEncoderDecoder according to the present invention, and the DefaultEncoderDecoder invokes the necessary get methods.

The process starts at 502 and proceeds to reading the Interface Repository to determine the number and types of data attributes for the class of this object 504. A test for the existence of more attributes is made at 506. If no more attributes exist an "end of attributes" marker is stored 508 and the process terminated 520. If more attributes exist, a test is made to determine if the next attribute is persistent 510. If not, processing returns to test 506. If a persistent attribute is found, the length of the attribute name is stored 512 and the attribute name and type are stored 514. A "get" method request is constructed using the attribute name and data type and the method invoked 516. Finally, the data returned from the "get" method is stored 518 and processing returns to test 506.

Objects are restored from persistent storage through the invocation of set methods for the persistent attributes of the object. The request to restore an object is initiated by the program by invoking a method on the Persistent Storage Manager. The Persistent Storage Manager then instantiates an IOGroupManager which in turn instantiates an EncoderDecoder (in this case the DefaultEncoderDecoder.)

Figure 6:
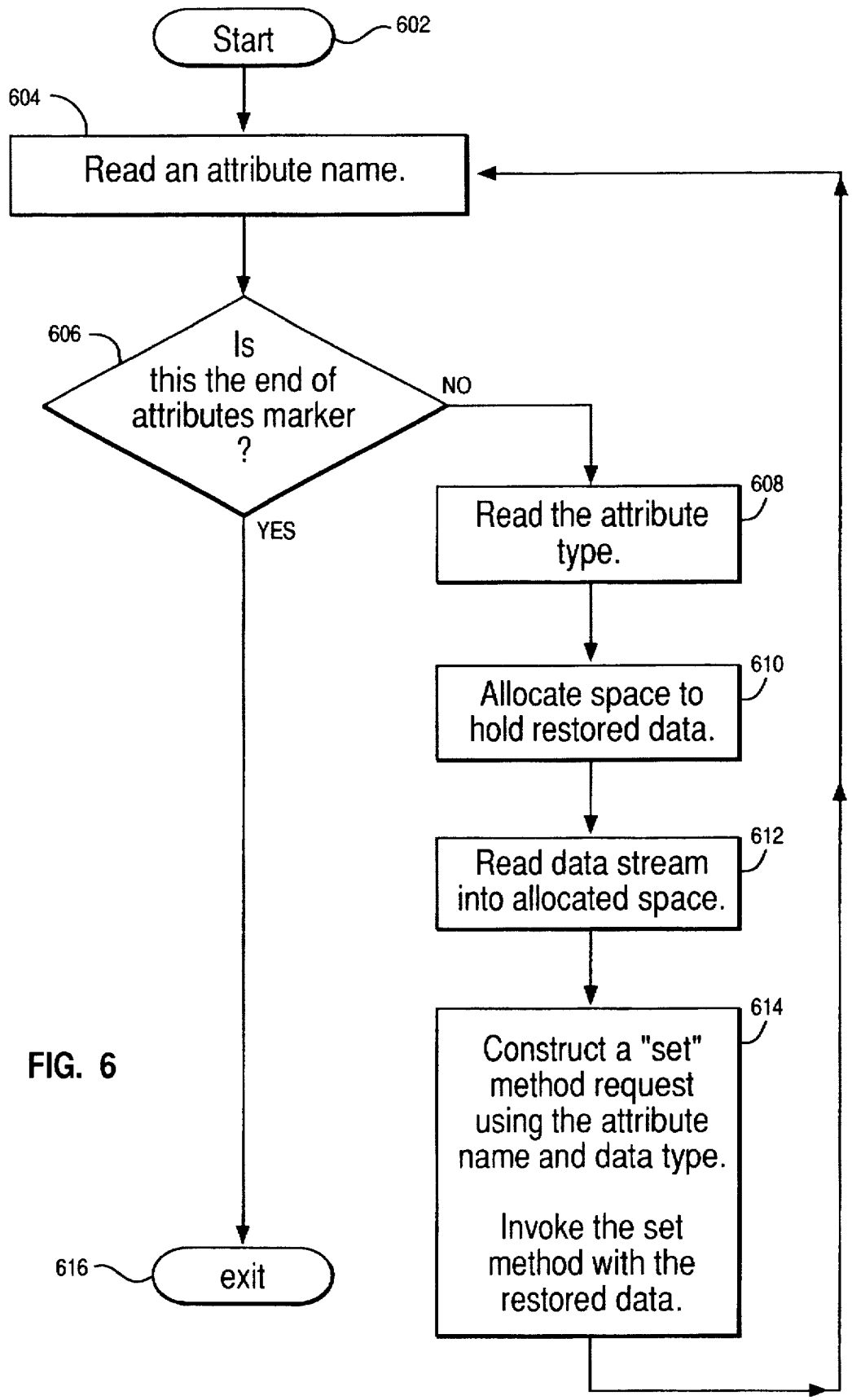
FIG. 6 is a flowchart depicting the DefaultDecode process according to the present invention.

The restoration of an object is accomplished by the process steps illustrated in FIG. 6. The process starts at 602 and proceeds immediately to step 604 that reads an attribute name from the persistent storage stream. The result is tested to determine whether or not it is an "end of attribute" marker 606. If so, the restoration ends 616. Otherwise, the system reads the attribute type 608, allocates space to hold the restored data 610, and reads the data stream into the allocated space 612. A "set" method is constructed using the attribute name and data type and the method is then invoked 614. Upon return, control passes to step 604.

This storage format allows the implementation and even the interface to the object to be changed without loss of persistent data. Upward compatibility of data is controlled by overriding the "set" methods to support the current structure.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A system for storing data for a selected object to a persistent medium in an object oriented computer system also having a memory, a processor, and operator interaction means, wherein data resides in system objects in said memory, and wherein said data is manipulated by processing methods associated with said object, the system comprising:

attribute extraction means for determining a number, names, and types of attributes defined for said selected object, said attribute extraction means being responsive to a data storage request;

method construction means for constructing a method invocation request to get attribute values for the attributes extracted by said attribute extraction means, said method construction being responsive to said data storage request;

data formatting means for formatting said attribute names, types and values for storage to said persistent medium; and data restoration means for restoring said attributes to a restored object instance.

2. The system of claim 1, wherein said method construction means invokes a "get" method.

3. The system of claim 1, wherein said data restoration means comprises:

persistent medium access means for reading data from said persistent medium;

storage allocation means for allocating storage in said memory for attribute data to be restored;

method construction means for constructing a method invocation request to restore attribute data.

4. The system of claim 3, wherein the method construction means constructs a "set" method request using attribute name and type.

5. A method of storing and restoring object persistent attribute data to and from a persistent storage medium, said method operating in an object oriented system wherein each object instance contains attribute data that is manipulated by process methods, and wherein information on the number and type of attributes of an object is stored in a repository, the method comprising the steps of:

defining a plurality of data extraction methods for each persistent attribute;

accessing said repository to determine the number, name and type of persistent attributes for said object;

constructing a request to invoke one of said plurality of data extraction methods based on said name and type of persistent attributes to return a plurality of attribute data values;

storing to said persistent medium a string of attribute names and types;

storing to said persistent medium a string of said attribute data values;

restoring said object data by successively executing restoration methods associated with said attributes.

6. The method of claim 5 wherein said restoring step includes the steps of:

reading an attribute name from said persistent medium;

determining attribute type from said persistent medium;

allocating space for said attribute value;

constructing a method invocation request to set the restored attribute data.

7. A computer program product having a computer readable medium having computer program logic recorded thereon for storing and restoring persistent attribute data to and from a persistent medium, said computer program product comprising:

means for defining a plurality of data extraction methods for each persistent attribute;

means for accessing said repository to determine the number, name and type of persistent attributes for said object;

means for constructing a request to invoke one of said plurality of data extraction methods based on said name and type of persistent attributes to return a plurality of attribute data values;

means for storing to said persistent medium a string of attribute names and types;

means for storing to said persistent medium a string of said attribute data values;

means for restoring said object data by successively executing restoration methods associated with said attributes.

8. The computer program product of claim 7 wherein said means for restoring comprise:

means for reading an attribute name from said persistent medium;

means for determining attribute type from said persistent medium;

means for allocating space for said attribute value;

means for constructing a method invocation request to set the restored attribute data.

\* \* \* \* \*